No. 875,483. PATENTED DEC. 31, 1907.
G. B. & J. H. YOUNG.
CORN POPPER.
APPLICATION FILED JULY 20, 1907.
2 SHEETS—SHEET 2.
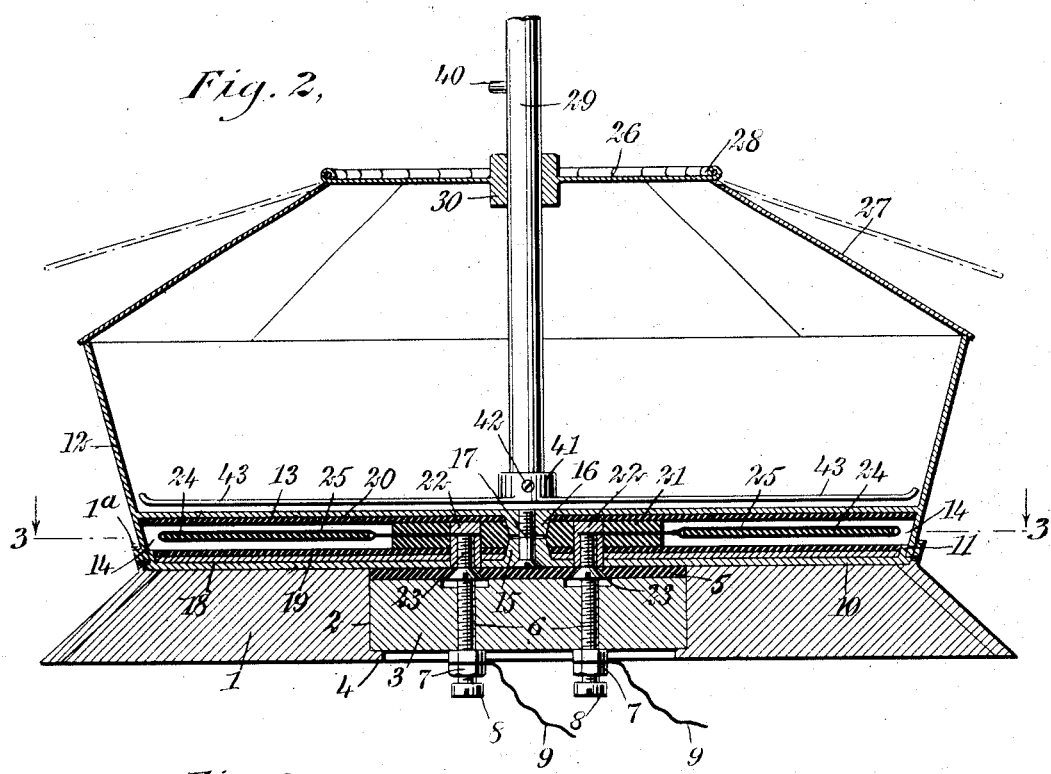
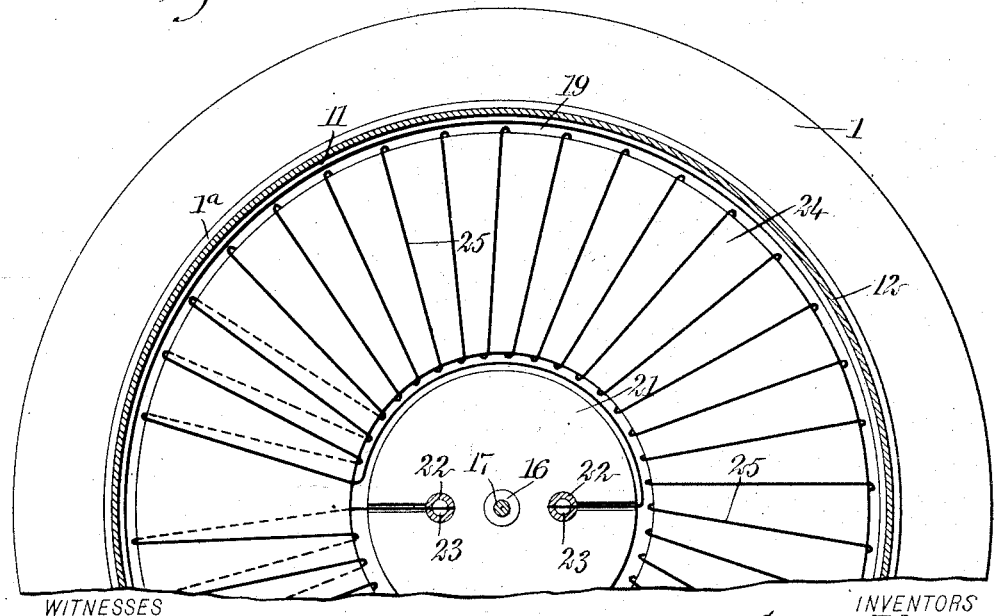
WITNESSES
Edward Thorpe.
John K. Beachamp
INVENTORS
George B. Young
Joseph H. Young
BY Munn & Co
ATTORNEYS

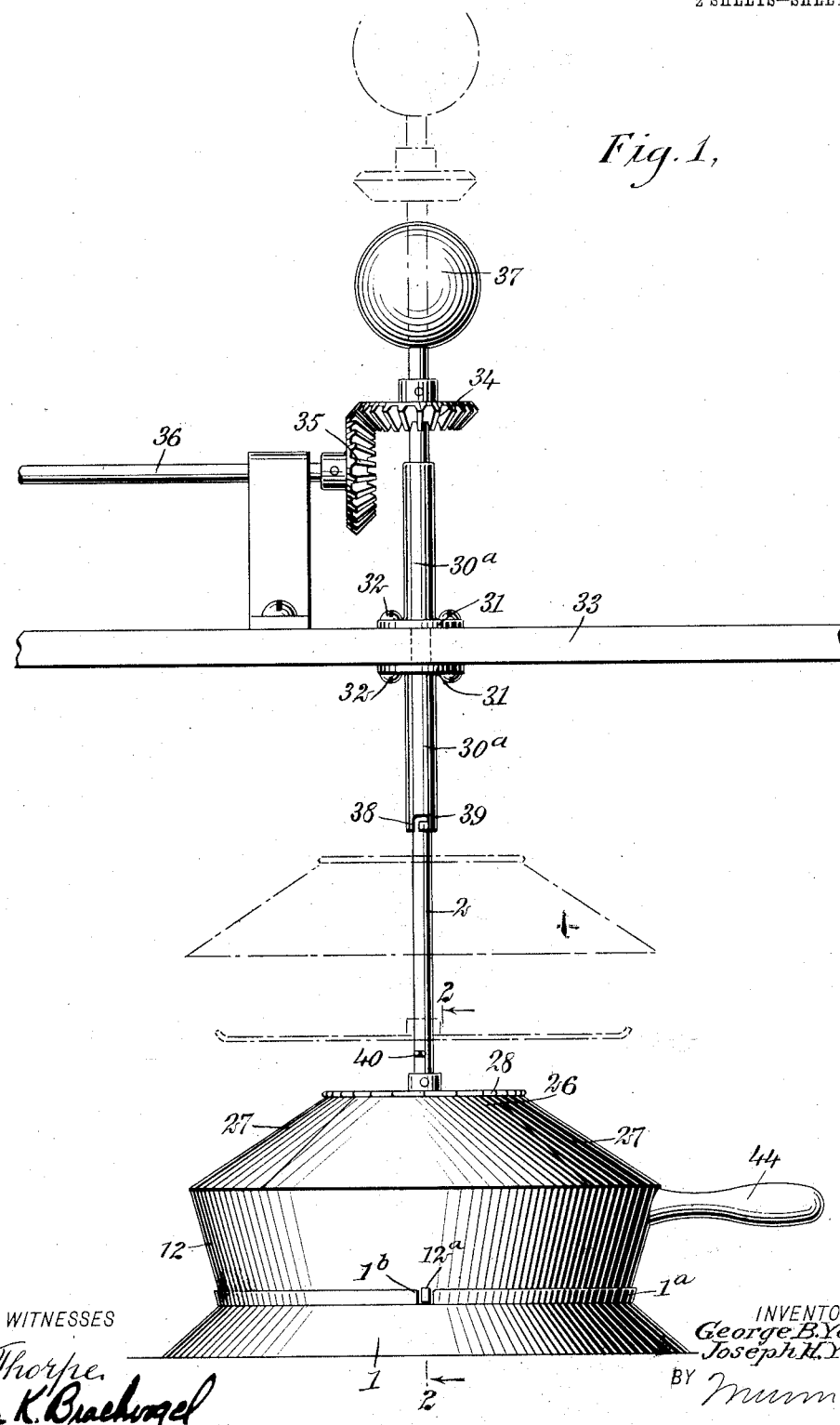

UNITED STATES PATENT OFFICE.

GEORGE B. YOUNG AND JOSEPH H. YOUNG, OF EL PASO, TEXAS.

CORN-POPPER.

No. 875,483.　　　　Specification of Letters Patent.　　　Patented Dec. 31, 1907.

Application filed July 20, 1907. Serial No. 384,693.

*To all whom it may concern:*

Be it known that we, GEORGE B. YOUNG and JOSEPH H. YOUNG, both citizens of the United States, and residents of El Paso, in the county of El Paso and State of Texas, have invented a new and Improved Corn-Popper, of which the following is a full, clear, and exact description.

This invention relates to corn poppers, and embodies improvements upon the corn popper of our invention disclosed in the United States Patents Nos. 858,317 and 858,318.

The invention is particularly useful for popping, salting and buttering corn, but is equally applicable to, and can be used advantageously in, roasting peanuts, chestnuts and the like, and for cooking or otherwise preparing food products by the application of heat.

An object of the invention is to provide a simple, strong and durable device for cooking, roasting and otherwise preparing food products by the application of heat, preferably supplied from an electrical source, and having means for agitating the material undergoing preparation.

A further object of the invention is to provide a device of the class described having an electric heating coil suitably constructed to distribute the heat uniformly under the pan, and having an agitator removably arranged within the pan for working the material undergoing preparation, to prevent the burning or scorching of the same.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which Figure 1 is an elevation of our invention showing certain parts in different positions in dotted outline; Fig. 2 is a section on the line 2—2 of Fig. 1; and Fig. 3 is a section on the line 3—3 of Fig. 2 showing a part of the device broken away.

Before proceeding to a more detailed explanation of our invention it should be understood that while we prefer to employ an electrical source of heat the device can be heated by any other preferred or common means.

The invention illustrated in the accompanying drawings and described hereafter differs substantially from the form of the corn popper already covered by our United States patents in that the pan to receive the material such as corn, peanuts, chestnuts and the like, is stationary, and the material is agitated by an adjustable device which prevents the burning of the material. The agitator comprises a rotatable shaft having arms which move within the pan and continually work the material. We provide means for raising the agitating device to an inoperative position without the pan, and for holding the same in the inoperative position. At the same time the cover of the pan is lifted from the same, leaving the contents of the pan available for examination and removal.

Referring more particularly to the drawings, 1 represents a base of any suitable material and adapted to carry the pan upon a table or other suitable support. The base has a substantially central opening 2 therethrough, in which is mounted a block 3, held in position by a peripheral flange 4 at the lower edge of the opening 2. At the upper face of the block 3 is arranged an insulating plate 5. Threaded stems 6, of electrically conductive material such as copper, are arranged in correspondingly threaded openings of the block 3, and have nuts 7 and heads 8 at the ends projecting from the under side of the block. The stems 6 constitute binding posts for connecting the device with a source of electricity by means of conductors 9 of conventional type.

A base plate 10 having an annular peripheral flange 11, is mounted upon the base 1 within an upwardly extending rim 1ª of the base, and carries the pan 12, the lower edge of which is arranged between the flange 11 and the rim 1ª. The rim 1ª has recesses 1ᵇ for engaging projections 12ª of the pan, to hold the latter firmly upon the base. The bottom 13 of the pan is spaced above the lower edge thereof, so that a chamber 14 is formed between the bottom of the pan and the base plate 10. The base plate 10 and the bottom 13 have registering central bosses 15 and 16, respectively, secured together by means of a screw 17, thereby firmly mounting the pan upon the base. The base plate 10 carries insulating sheets 18 and 19, having suitable openings to receive the boss 15. A similar insulating plate 20 is arranged at the under side of the bottom 13, and presents a central opening to receive the boss 16. A coil support 21, is located in the heating chamber 14 around the bosses 15 and 16, and is formed preferably of a non-conducting material. The coil support has openings therethrough in which are arranged plugs 22, having screws 23 of electrically conductive material and with the heads located in openings of the plate 5. The arrangement is such that the screws 23 contact with the stems 6 thereby acting as conductors for the electric current from the source of supply.

A heating coil comprising an annular core 24 and coils 25 wound thereupon, is arranged within the chamber 14 around the coil support 21. The ends of the coils pass through suitable openings in the coil support to the respective plugs 22, within which they contact with the screws 23. In this manner the electric current is led from the supply to the heating coil.

The pan is provided with a cover 26 having lids 27 mounted thereupon by means of hinges 28. A substantially vertical shaft 29 is arranged over the pan and passes through a suitable collar 30 of the cover. The shaft 29 is slidably arranged in sleeves 30ᵃ mounted by means of flanges 31 and screws 32 upon a support 33. Near the upper end the shaft has a rigid bevel gear 34 adapted to mesh with a gear 35 carried by a power shaft 36. The latter may be driven by any suitable means. Beyond the bevel gear 34 the shaft carries a weight 37, normally forcing the shaft downward and holding the gears 34 and 35 in operative engagement. At the edge, the lower sleeve 30ᵃ has a recess 38 presenting a laterally disposed part 39 and adapted to receive a projection 40 of the shaft.

At the lower edge the shaft has a head 41, rigidly mounted thereupon by means of a set screw 42, and provided with laterally extending stirring or agitating arms 43, which serve to work material within the pan when the shaft 29 is driven by means of the driving shaft 36.

The pan has a handle 44 by means of which it can be easily manipulated. When it is desired to examine material undergoing preparation in the pan, it can be inspected by raising one of the lids 27. To permit the removal of the material from the pan, the cover and the agitating device can be displaced by sliding the shaft 29 upwardly in the sleeves until the projection 40 engages the recess 38 of the lower sleeve. When the projection is seated within the recess, a slight lateral movement will bring the projection into a position within the laterally disposed part 39 of the recess, whereby the shaft is held in the elevated position. When the shaft is in this position, the cover and the agitator are located above the pan and the contents of the same are available for removal or other operations.

Having thus described our invention we claim as new and desire to secure by Letters Patent:—

1. In a device of the class described, in combination, a pan, means for heating said pan, an agitator movable toward and away from said pan, and driving means for said agitator, said driving means being operatively connected with said agitator when the latter is in position within said pan, and being inoperative with respect to said agitator when the same is displaced from said pan.

2. In a device of the class described, in combination, a base, a base-plate on said base, a pan arranged upon said base-plate and having a rim located between said base and said base-plate, said pan having a bottom remote from said base-plate, insulators between said bottom and said base-plate and adjacent thereto respectively, means for rigidly connecting said base-plate and said bottom, a coil support between said base-plate and said bottom, a heating coil around said coil support and having the ends of the coil carried by said coil support, and means for electrically connecting the ends of said coil with a source of electrical supply.

3. In a device of the class described, in combination, a base having a rim, a base plate on said base and presenting a flange, a pan mounted upon said base plate between said rim and said flange, said pan having a bottom remote from said base plate, insulators between said bottom and said base plate and adjacent thereto respectively, means for rigidly connecting said base plate and said bottom, a coil support between said base plate and said bottom, a heating coil around said coil support and having the ends of the coil carried by said coil support, binding posts carried by said base and adapted to be connected with a suitable source of electrical supply, and means for electrically connecting said binding posts and the ends of said coil.

4. In a device of the class described, in combination, a base, a pan mounted upon said base, means for heating said pan, a shaft having stirring arms, means for movably mounting said shaft whereby said stirring arms are arranged within said pan when said shaft is in a depressed position, means for operatively connecting said shaft with driving means when said shaft is in a depressed position, whereby said shaft is not operated when the same is elevated, means for holding said shaft in an elevated position, and a cover for said pan and controlled by said shaft.

5. In a device of the class described, in combination, a pan, means for heating said pan, a shaft having stirring arms, said shaft being movable toward and away from said pan, a driving shaft, said shaft in one position being operatively connected with said driving shaft, means for holding said shaft in an inoperative position, and a cover for said pan carried by said shaft.

6. In a device of the class described, in combination, a base, a pan mounted upon said base, means for heating said pan, a sleeve, a shaft in said sleeve and having stirring arms, said shaft being movable toward and away from said pan, a driving shaft, said shaft in one position being operatively connected with said driving shaft, means on said sleeve for holding said shaft in an inoperative position, and a cover for said pan carried by said shaft.

7. In a device of the class described, in combination, a base, a pan mounted upon said base, means for heating said pan, a sleeve, a shaft in said sleeve and having stirring arms, said shaft being movable toward and away from said pan, a driving shaft, said shaft and said driving shaft having gears adapted to mesh when said shaft is in a depressed position, said gears being inoperatively disposed relative to one another when said shaft is in an elevated position, means on said sleeve for holding said shaft in an elevated position, and a cover for said pan carried by said shaft and movable therewith.

In testimony whereof we have signed our names to this specification in the presence of two subscribing witnesses.

GEORGE B. YOUNG.
JOSEPH H. YOUNG.

Witnesses:
C. S. PICKRELL,
W. S. SMALLWOOD.